(12) United States Patent
Chan et al.

(10) Patent No.: US 9,888,128 B1
(45) Date of Patent: Feb. 6, 2018

(54) METHODS AND SYSTEMS FOR SHARING DATA USAGE AT A PLURALITY OF NETWORK DEVICES

(71) Applicant: PISMO LABS TECHNOLOGY LIMITED, Hong Kong (HK)

(72) Inventors: Ho Ming Chan, Hong Kong (HK); Kit Wai Chau, Hong Kong (HK); Man Kit Kwan, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 6 days.

(21) Appl. No.: 15/118,893

(22) PCT Filed: Dec. 31, 2015

(86) PCT No.: PCT/IB2015/060066
§ 371 (c)(1),
(2) Date: Aug. 26, 2016

(87) PCT Pub. No.: WO2017/115115
PCT Pub. Date: Jul. 6, 2017

(51) Int. Cl.
*H04M 11/00* (2006.01)
*H04M 15/00* (2006.01)
*H04W 4/24* (2009.01)
*H04L 12/14* (2006.01)

(52) U.S. Cl.
CPC ........ *H04M 15/7652* (2013.01); *H04L 12/14* (2013.01); *H04M 15/852* (2013.01); *H04M 15/866* (2013.01); *H04M 15/886* (2013.01); *H04W 4/24* (2013.01); *H04M 15/8214* (2013.01)

(58) Field of Classification Search
CPC ........... H04M 15/7652; H04M 15/852; H04M 15/866; H04M 15/886; H04M 15/8214; H04L 12/14; H04W 4/24
See application file for complete search history.

(56) References Cited

U.S. PATENT DOCUMENTS 9,215,547 B2 * 12/2015 Marsden ............... H04W 4/001
2016/0165451 A1 * 6/2016 Legris .................. H04W 12/08
455/410

* cited by examiner

*Primary Examiner* — Keith Fang
(74) *Attorney, Agent, or Firm* — Hershkovitz & Associates, PLLC; Abe Hershkovitz

(57) ABSTRACT

The present invention discloses methods and systems for sharing data usage by a plurality of SIM cards at a plurality of network devices. Each of the plurality of network devices is capable of housing at least one SIM card from the plurality of SIM cards. The method comprises the steps of determining the total data usage allowance. A remaining total data usage allowance is determined by either retrieving it from a carrier server or by subtracting aggregated data usage information from the total data usage allowance. The method further comprises restricting use of one or more of the plurality of SIM cards when the remaining total data usage allowance is below a first threshold until the remaining total data usage allowance is above the first threshold. The total data usage allowance is changed to a first value periodically or according to an administrator's instruction.

18 Claims, 7 Drawing Sheets

METHODS AND SYSTEMS FOR SHARING DATA USAGE AT A PLURALITY OF NETWORK DEVICES

TECHNICAL FIELD

The present invention relates, in general, to the field of computer networks. More particularly, the present invention relates to methods and systems for sharing data usage at a plurality of network devices.

BACKGROUND ART

Administrators of network devices, such as gateways and routers, may manage a plurality of network devices which house one or more SIM cards for data communication. It is common that data plans associated with SIM cards have a usage limit or data usage allowance, and a time limit for which the usage limit or data usage allowance is valid. Most service providers charge a low price per MegaByte (MB) data unit as long as the usage is below a certain threshold, and when the usage goes above the certain threshold, the price per MB increases. Therefore, if the usage limit is not, cost of using SIM cards for Internet connectivity is minimized. There may be scenarios where a SIM card is removed from one network device and used at another network device. In these scenarios, it is beneficial for each device to have information about how much data usage allowance is remaining, and what the usage limit should be for using the SIM card for data communication. When an administrator manages a plurality of network devices, it may be troublesome to keep track of historical activity information, usage limits and time limits of each SIM card at each network device. In addition to usage limits, there may be other factors involved in deciding whether a SIM card should be used for data communications. Therefore, solutions are required for allowing network devices to automatically have access to historical activity information about SIM cards, for allowing more efficient use or sharing of data usage.

DISCLOSURE OF INVENTION

Summary of Invention

The present invention discloses methods and systems for sharing data usage by a plurality of SIM cards at a plurality of network devices. Each of the plurality of network devices is capable of housing at least one SIM card from the plurality of SIM cards. The method comprises the steps of determining the total data usage allowance. A remaining total data usage allowance is determined by either retrieving it from a carrier server or by subtracting aggregated data usage information from the total data usage allowance. The aggregated data usage information can be based on data usage information received from each of the plurality of network devices. The method further comprises restricting use of one or more of the plurality of SIM cards when the remaining total data usage allowance is below a first threshold until the remaining total data usage allowance is above the first threshold. The total data usage allowance is changed to a first value periodically or according to an administrator's instruction. The plurality of SIM cards may use the same cellular network or may use different cellular networks.

According to one of the embodiments, the total data usage allowance is determined by retrieving the total data usage allowance from a carrier server or retrieving from a record. The record is created as per an administrator's instruction.

According to one of the embodiments, restricting use of one or more of the plurality of SIM cards is performed after receiving a first instruction from the first server.

According to one of the embodiments, restricting use of one or more of the plurality of SIM cards is based on priority of the plurality of network devices. Network devices with higher priorities are allowed to use a higher percentage of the remaining total data usage allowance.

According to one of the embodiments, each of the plurality of network devices is allowed to use equal amount of the total data usage allowance.

According to one of the embodiments, the present invention further discloses sending a request message to a server for determining the remaining total data usage allowance. The request message comprises data plan information, and/or identity of the plurality of network devices.

According to one of the embodiments, the present invention further discloses sending a notification to a user or administrator when the remaining total data usage allowance is below the first threshold. The notification is chosen from a group consisting of email, instant message, short message service (SMS), phone call, message shown in a web page, popup message at a web page, alarm, a sound, blinking light, and flashing a light-emitting diode (LED).

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), WiMax, General packet radio service (GPRS), Global System for Mobile Communications (GSM), Enhanced Data rates for GSM Evolution (EDGE), Code division multiple access (CDMA), WiFi, CDMA2000, Wideband CDMA (WCDMA), Time Division CDMA (TD-SCDMA), BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, metropolitan area network (MAN), wide area network (WAN), the public switched telephone network (PSTN), a satellite communication system, a cable transmission system, and/or the like.

Figure 1A:
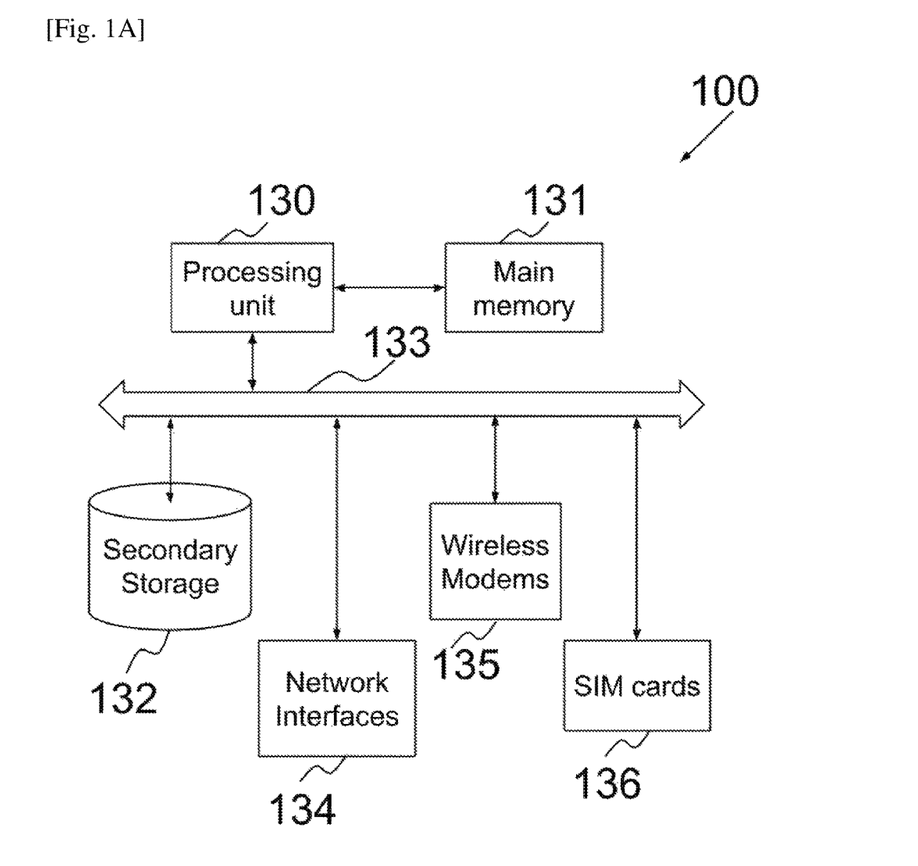
FIG. 1A is a block diagram illustrating the architecture of first device 100, according to one of the embodiments of the present invention.

FIG. 1A is a block diagram illustrating the architecture of first device 100, according to one of the embodiments of the present invention. First device 100 can be a network device, such as a router or gateway. First device 100 comprises processing unit 130, main memory 131, secondary storage 132, system bus 133, at least one network interface 134, at least one wireless modem 135, and at least one SIM card slot 136. SIM card slot 136 may be a part of first device 100, or may be a part of a first modem which is connected to first device 100. Processing unit 130 and main memory 131 are connected to each other directly. System bus 133 connects processing unit 130 directly or indirectly to secondary storage 132, network interface 134, wireless modem 135, and SIM card slot 136. Using system bus 133 allows first device 100 to have increased modularity. System bus 133 couples processing unit 130 to secondary storage 132, network interface 134, wireless modem 135, and SIM card slot 136. System bus 133 can be any of several types of bus structures including a memory bus, a peripheral bus, and a local bus using any of a variety of bus architectures. Secondary storage 132 stores program instructions for execution by processing unit 130. The methods described in the embodiments below are processes carried out by processing unit 130.

The scope of the invention is not limited to first device 100 having only one wireless modem 135 and only one SIM card slot 136, such that there can be a plurality of wireless modems and a plurality of SIM card slots.

If there are a plurality of SIM cards inserted in the plurality of SIM card slots of first device 100 respectively, the plurality of SIM cards may use the same cellular network or may use different cellular networks. This is because the plurality of SIM cards may be provided by one service provider or carrier, or may be provided by different service providers or carriers. One of the benefits of using one service provider or carrier is that the billing and account could be easier. Further the time to reset the total data usage allowance can be set to the same date for all SIM cards. The benefits of using plurality of service providers or carriers include network redundancy and possibly load balancing across multiple wireless networks. However, when the reset time for the SIM cards are different, the total data usage allowance will have to be adjusted whenever usage limit for a SIM card is reset.

Figure 1B:
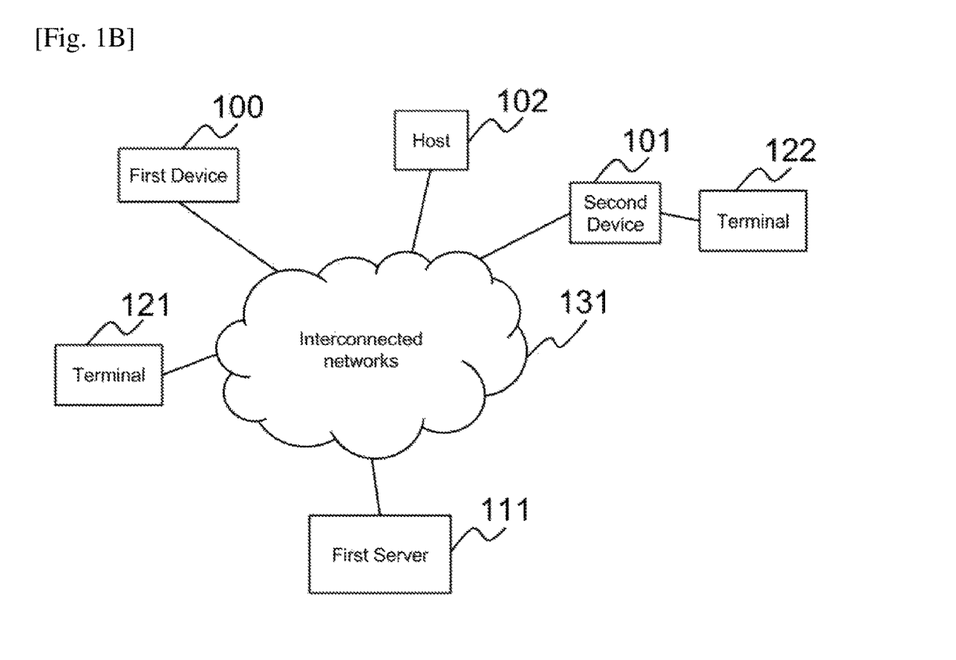
FIG. 1B illustrates a network environment according to various embodiments of the present invention.

FIG. 1B illustrates a network environment according to various embodiments of the present invention. First device 100 and Second device 101 are connected to interconnected networks 131 through one or more of their Wide Area Network (WAN) interfaces. Terminal 122 is connected to node 102 through a Local Area Network (LAN) interface of node 102. Terminal 121 connects to interconnected networks 131. Host 103 is connected to interconnected networks 131 and can connect to first server 111 through interconnected networks 131. First server 111 also connects to interconnected networks 131. A user may access first server 111 using a terminal, such as terminals 121 and 122. A user may use terminal 121 to access first server 111 directly through interconnected networks 131. Similarly, a user may use terminal 122 to access first server 111 through node 102 and interconnected networks 131.

According to one of the embodiments of the present invention, a management server, such as first server 111, is used to manage hosts or nodes, such as first device 100 and second device 101, remotely. First server 111 can be a router, a network node, a server, a desktop, a laptop, a mobile device or any electronic device that may store information related to a node and through which a node can be managed. First server 111 can be located in the same network of nodes or terminals or can be located in a remote network. First server 111 stores information related to the hosts or nodes that it manages. First server 111 comprises at least one processing unit, at least one network interface, and a storage medium with at least one main memory and at least one secondary storage. The information includes historical SIM card activity information of SIM cards used at the hosts or nodes that it manages. SIM cards can be used at different devices at different times. The benefit of storing historical SIM card activity information is that when SIM cards are used at a new device, the activity information of the SIM card can be made known to the different device. This allows the new device to use the SIM card accordingly. This is further elaborated below.

Figure 2:
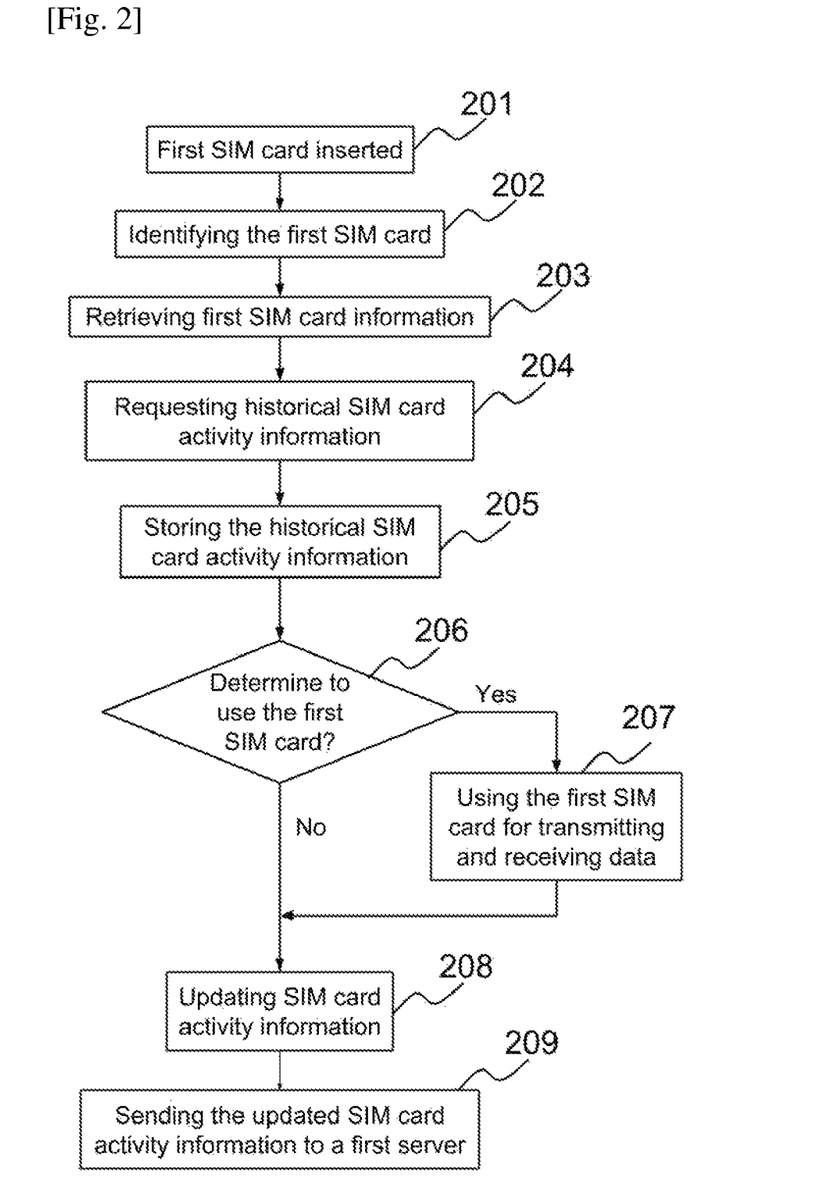
FIG. 2 is a flowchart illustrating a process according to one of the embodiments of the present invention.

FIG. 2 is a flowchart illustrating a process according to one of the embodiments of the present invention. In step 201, a first SIM card is inserted in SIM card slot 136 of first device 100. Processing unit 130 of first device 100 identifies the first SIM card in step 202. For example, the first SIM card is identified using an international mobile subscriber identity (IMSI) or a phone number associated with the first SIM card. In general, each SIM card used for wireless communication service has a unique serial number known as an international mobile subscriber identity (IMSI). The IMSI comprises a set of wireless network identification values. Portions of the IMSI can be accessed from the SIM card in first device 100 to configure first device 100 for a particular wireless network service provider's network. Processing unit 130 then retrieves in step 203, first SIM card information, which is information of the first SIM card such as identity, service provider, phone number, data plan, or other relevant information of the first SIM card. The first SIM card information may be stored in the first SIM card, and retrieved by first device 100 from the first SIM card, or may be retrieved from a remote server, such as first server 111. The first SIM card information may also be based, at least in part, on the historical SIM card activity information of the first SIM card.

In step 204, first device 100 sends a request message to the first server 111 for requesting historical SIM card activity information associated with the first SIM card. For example, the request message contains the first SIM card information, in order to allow first server 111 to determine the identity of the SIM card for which historical SIM card activity information is being requested. The request message may also contain authentication information, for allowing the first server 111 to determine whether the request message is received from an authentic device, and for authenticating the request message. The authentication information may include identity of the first device 100 and a shared private key. First device 100 may then receive the historical SIM card activity information from the first server 111. After receiving the historical SIM card activity information from the first server 111, first device 100 stores the historical SIM card activity information in a first database in a storage medium, such as secondary storage 132.

The historical SIM card activity information is information of the usage activities associated with a SIM card. The historical SIM card activity information may contain one or more of: amount of data usage left in a time period, performance report, usage cost, and data plan information. The data usage information may include amount of data used in a specific time period, or may include total amount of data used. Performance report contains information of performance of connections established using the SIM card in the past. Usage cost may include the cost incurred for using the SIM card for a specific time period, or may include the total cost incurred. Data plan information includes the amount of data purchased, or amount of data that is included in the data plan. Data plan information may also include validity date of the data plan and a time limit, if any, for using a specific amount of data purchased.

In one example, first device 100 sends the request message to first server 111, and receives the historical SIM card activity information from first server 111. In another example, first device 100 sends the request message to a carrier or service provider of the first SIM card, and receives the historical SIM card activity information from the carrier or service provider. The request message sent to the carrier or service provider by using Unstructured Supplementary Service Data (USSD) protocol. In another example, first device 100 sends the request message to the first server, and if no historical SIM card activity information is received, or an error message is received from first server 111, first device 100 sends the request message to the carrier or service provider. It is optional for first device 100 to send the historical SIM card information to first server 111.

Figure 3:
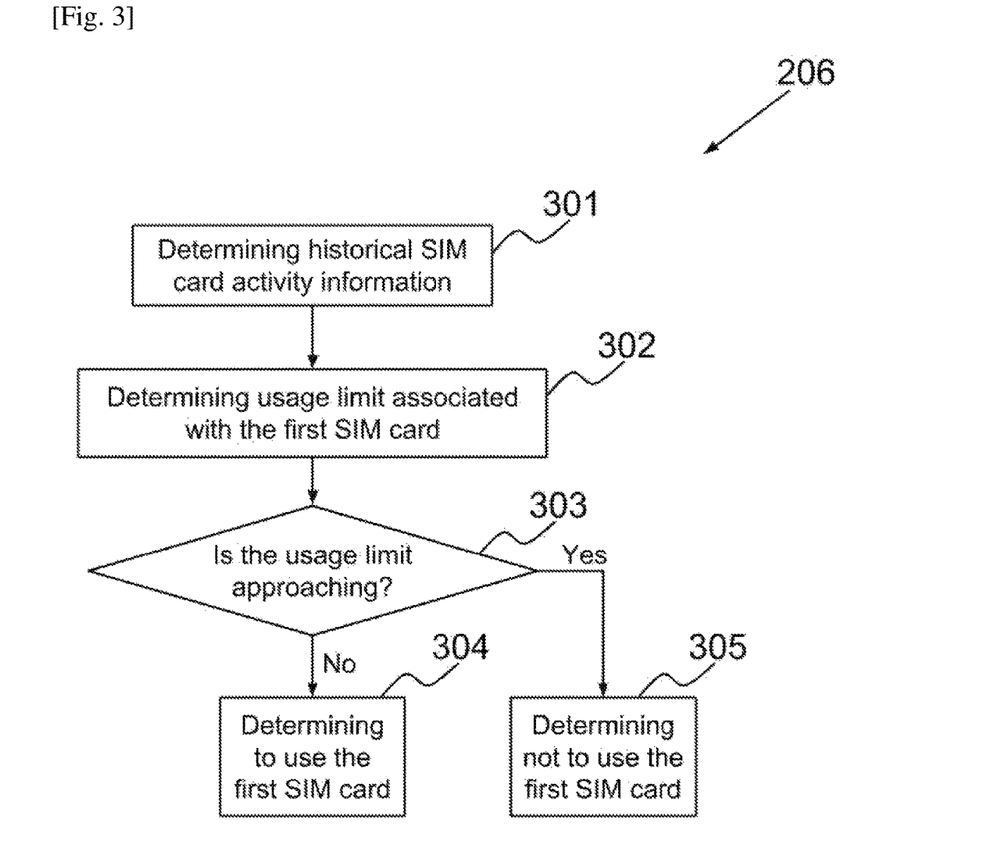
FIG. 3 is a flowchart illustrating the process of step 206 for determining whether or not to use the first SIM card according to one of the embodiments of the present invention.

In step 206, processing unit 130 determines whether or not to use the first SIM card after receiving the historical SIM card information from a carrier server of the carrier or service provider. The decision in step 206 is based, at least in part, on the historical SIM card activity information of the first SIM card. The process carried out at step 206 is illustrated in FIG. 3 according to one of the embodiments. If the processing unit 130 determines to use the first SIM card, first device 100 uses the first SIM card for transmitting and receiving data in step 207. First device 100 uses the first SIM card in step 207 by establishing a connection using a network associated with the first SIM card. If the processing unit 130 determines not to use the first SIM card, the first device 100 does not use the SIM card for transmitting or receiving data. In one example, first device 100 sends an information message to a user or administrator to inform about the decision taken in step 206. One of the benefits of sending the information message is that the user or administrator is aware that the first SIM card is not being used, or is being used, such that the user or administrator may take necessary actions to prevent the use or to continue the use of the first SIM card. In another example, the decision in step 206 is based, at least in part, on an input from the user or administrator. When first device 100 determines whether to use or not to use the first SIM card based on the historical SIM card activity information, first device 100 informs the user or administrator about the decision by sending an information message. The user or administrator then confirms whether the first SIM card should be used or not used.

In step 208, processing unit 130 updates SIM card activity information associated with the first SIM card. The updated SIM card activity information is based, at least in part, on the usage of the first SIM card by first device 100 for transmitting and receiving data. The updated SIM card activity information is stored in the first database, and thus the first database is updated. In one of the embodiments, processing unit 130 updates the SIM card activity information in the first database and stores it in the storage medium periodically. As it is likely that the usage increases, it is beneficial to update and store the SIM card activity information periodically.

In step 209, first device 100 then sends the updated SIM card activity information to first server 111. The updated SIM card activity information is sent to the first server 111 periodically. In one variant, the updated SIM card activity information is sent to the first server 111 when a first condition is satisfied, i.e., it is determined that the first SIM card will no longer be used for transmitting and receiving data at first device 100. There are various ways of determining that the first SIM card will no longer be used at first device 100. For example, the first condition is satisfied when a connection established using the first SIM card is disconnected. In another example, the first condition is satisfied when the SIM card is removed of the first device 100. In this case, the most recent SIM card activity information stored in the first database is considered as the updated SIM card activity information, and sent to first server 111. However, the updated SIM card activity information may not be entirely accurate, as the SIM card had been removed abruptly, and the actual usage may have been more than that specified in the updated SIM card activity information stored in the first database. In another example, a user or administrator sends a removal notification to the first device 100 before removing the first SIM card. When the removal notification is received, the first condition is satisfied and step 208 and 209 are performed. The removal notification may be received through a web interface, an application programming interface (API), a command line interface, or a console. The removal notification may also be received when the user or administrator presses a physical switch on first device 100.

FIG. 3 is a flowchart illustrating the process of step 206 for determining whether or not to use the first SIM card according to one of the embodiments of the present invention. In step 301, the historical SIM card activity information of the first SIM card stored in the first database in the storage medium is determined. In step 302, processing unit 130 determines a usage limit associated with the first SIM card. The usage limit may be specified in a data plan of the first SIM card, or may be specified by a user or administrator of first device 100. If, in step 303, processing unit 130 determines that the usage limit has been reached or is soon to be reached, processing unit 130 determines not to use the first SIM card in step 305. If the usage limit has not been reached and is not to be reached soon, processing unit 130 determines to use the first SIM card in step 304 for transmitting and receiving data.

For illustration purposes, when the first SIM card is inserted in step 201, the first device 100 determines, in step 203, that the data plan associated with the SIM card is such that, the usage limit is 10 GB for each month. The historical SIM card activity information stored in step 205 indicates that the total data usage of the SIM card for the current month has been 7 GB. Therefore, when the decision in step 206 is based on usage limit, processing unit 130 determines to use the first SIM card in step 207, as 3 GB of data is still remaining. In one embodiment, processing unit 130 further specifies a new usage limit of 3 GB associated with the first SIM card, and also specifies a time limit corresponding to the usage limit. This is beneficial, as it is preferred to not exceed the usage limit. The time limit can be calculated based on the current date. For example, the usage limit is 10 GB for the month of November, i.e. from first of November to thirtieth of November. If the current date is determined to be seventeenth of November, the time limit corresponding to the usage limit of 3 GB is set to fourteen days, i.e. till thirtieth of November.

According to one of the embodiments, the usage limit and corresponding time limit is specified according to a data plan purchased from a carrier or service provider for using the first SIM card. For example, usage limit of a pre-paid data plan is 10 GB, and time limit is one month from the date of purchase. If the pre-paid data plan is purchased on first of November, the usage limit is set to 10 GB and the time limit is till thirtieth of November. When the time limit is over, the usage limit may be updated. More precisely, the usage limit is updated or reset periodically according to a time. For example, after thirtieth of November, the usage limit is reset to 10 GB, and the time limit is set to be till thirtieth of December, which is one month. Alternatively, when the time limit is over, the pre-paid data plan should be purchased again, and the usage limit is then reset to 10 GB. When the time limit is over, the purchase may be performed automatically at the first network device, or may be performed after receiving an administrator's instruction. In another example, usage limit of a post-paid data plan is 10 GB, and time limit for using 10 GB of data usage is one month. Therefore, a monthly usage limit is 10 GB. A reset date, i.e. a date on which the usage limit is updated by a carrier or service provider, is the twentieth day of every month. Therefore, on the twentieth of every month the usage limit is reset to 10 GB, and the time limit is set to be till the twentieth of the next month.

According to one of the embodiments, the usage limit and time limit can be updated according to an administrator's instruction. Even if the time limit is not over, the usage limit can be updated according to the administrator's instruction. For example, when data usage is about to reach the 10 GB, the administrator sends an instruction to update the usage limit, such that the usage limit is increased, and the first SIM card can still be used for data communication. When there are a plurality of SIM cards housed in first device 100, the usage limits and time limits of each SIM card can be same or different. Therefore, the usage limits of each SIM card can be updated at different times. One of the benefits of updating usage limits of SIM card on different dates is that first device 100 is likely to have at least one SIM card with a data plan that has not exceeded its usage limit or time limit.

Most service providers charge a low price per MegaByte (MB) data unit as long as the usage is below a certain threshold, and when the usage goes above the certain threshold, the price per MB increases. Therefore, by setting a usage limit equal to the certain threshold, cost of using SIM cards for Internet connectivity is minimized. In one example, after step 203 is performed, a usage limit is specified by processing unit 130. The usage limit is specified based on the certain threshold set by the service provider, and also based on the historical SIM card activity information. For example, the first SIM card is associated with a data plan in which the cost for per MB of data is 1 cent when usage is below 10 GB. When the data usage goes above 10 GB, the cost for per MB of data becomes 2 cents. The historical SIM card activity information indicates that 4 GB of the data plan has already been used. Therefore, the usage limit is set to 6 GB, as it is preferred that the total usage does not go above 10 GB.

In one example, when a usage limit is reached or is approaching, a user or administrator is notified by first device 100. First device 100 may send a notification to the user or administrator to notify that the usage limit is about to be reached. The notification can be an email, an instant message, a short message service (SMS), a phone call, a message shown in a web page, a popup message at a web page, an alarm, a sound, a blinking light, a light-emitting diode (LED) being turned on and other indicators that can be used to indicating the usage limit is reached or about to be reached. The user or administrator may then send an instruction to first device 100 accordingly, in order to allow or not to allow first device 100 to use the first SIM card for data communication. If no instruction is received from the user or administrator, first device 100 continues using the first SIM card for data communication.

In another example, when usage limit is reached, first device 100 stops using the first SIM card without receiving any instruction from the user or administrator. An information message can be sent for informing the user or administrator that the first SIM card is no longer being used. This may be beneficial for keeping the usage cost to a minimum.

In another example, when usage limit is reached, first device 100 determines whether there are any other networks that the first device 100 can connect to using any SIM card or network interface other than the first SIM card. If the first device 100 is connected to, or is capable of connecting to other networks, first device 100 stops using the first SIM card. One of the benefits of this is that disruption in network connectivity at first device 100 is minimized.

According to one of the embodiments, the decision in step 206 is based, at least in part, on performance of network connection using the first SIM card. The historical SIM card activity information stored in step 205 contains a performance report of the first SIM card, which indicates performance of connections established using the first SIM card in the past. If the performance report of the SIM card indicates that the performance of connections has been good and satisfactory, first device 100 determines to use the first SIM card for transmitting and receiving data in step 207. The performance report may contain information about one or more of the following: throughput, error rates, packet latency, packet jitter, symbol jitter, quality of service, bandwidth, bit error rate, packet error rate, frame error rate, dropped packet rate, queuing delay, round trip time, capacity, signal level, interference level, bandwidth delay product, handoff delay time, signal-to-interface ratio, and signal-to-noise ratio.

According to one of the embodiments, the decision in step 206 is based, at least in part, on cost incurred for using the first SIM card. The historical SIM card activity information stored in step 205 contains usage cost of the first SIM card. If the cost incurred for using the first SIM card in a specific time period has exceeded a predefined cost limit, first device 100 determines not to use the first SIM card.

According to one of the embodiments, the decision in step 206 is based, at least in part, on validity of a data plan associated with the first SIM card. The historical SIM card activity information stored in step 205 contains data plan information. If the data plan is valid, and has not expired, first device 100 uses the first SIM card in step 207. If the data plan has expired or is invalid, first device 100 does not use the first SIM card. In one variant, if the data plan has expired or is invalid, first device 100 sends a message to inform the user or administrator that the data plan has expired or is invalid. The user or administrator can then send back a message to first device 100 to allow or not to allow using the first SIM card. The message sent to the user or administrator may further contain information of the updated price rates for using the first SIM card. This helps the user or administrator to decide whether or not to use the first SIM card.

Figure 4:
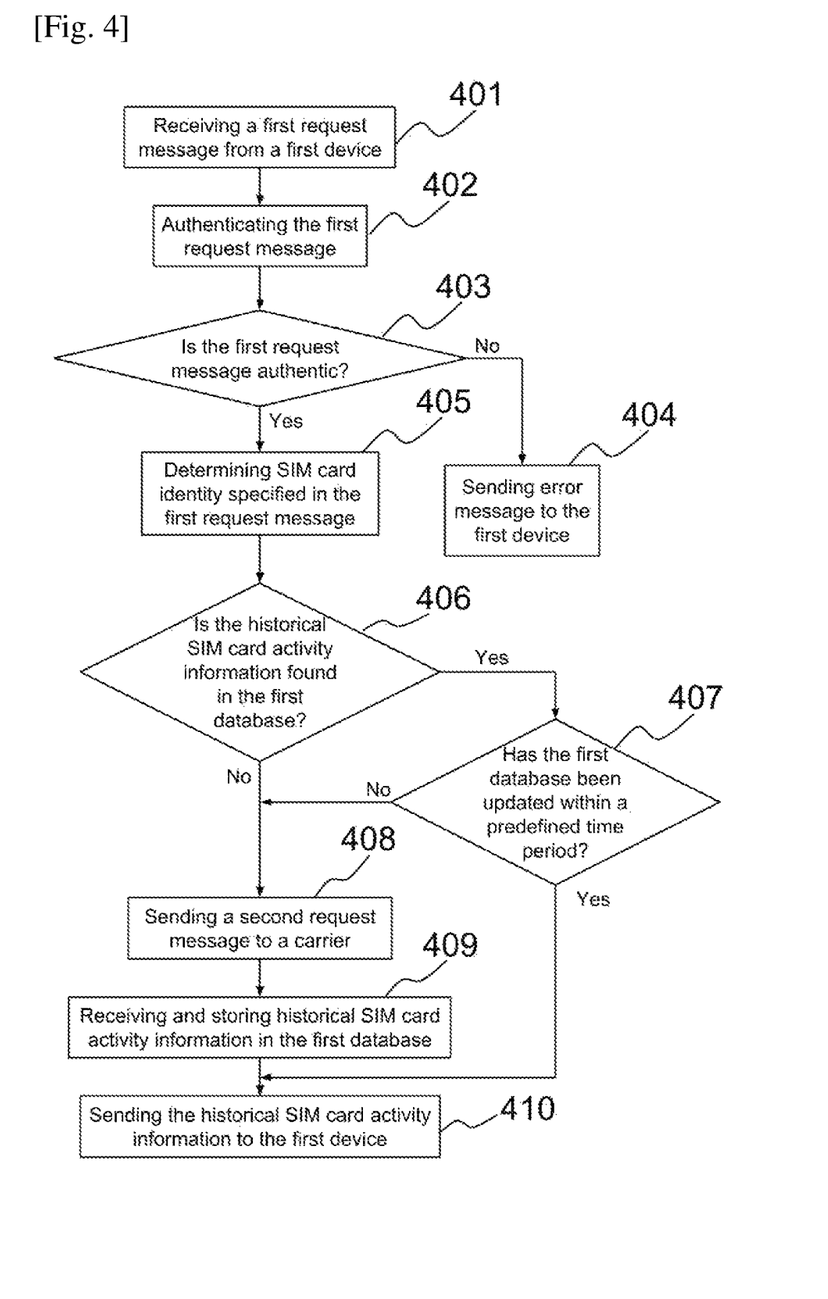
FIG. 4 is a flowchart illustrating a process carried out at first server 111 according to one of the embodiments.

FIG. 4 is a flowchart illustrating a process carried out at first server 111 according to one of the embodiments. First server 111 receives a first request message from first device 100 in step 401. In step 402, first server 111 processes authentication information comprised in the first request message and determines whether the first request message and first device 100 are authentic. Authenticating the first request message is important for security purposes in order to ensure that private data is not compromised to third parties. If the first request message is determined not to be authentic in step 403, an error message is sent to first device 100 in step 404, and the process ends. The error message contains information that the authentication information in the first request message is incorrect.

If the first request message is determined to be authentic in step 403, first server 111 processes the first request message, and determines a SIM card identity specified in the first request message in step 405. If the SIM card identity corresponds to the first SIM card, it is determined that first device 100 is requesting historical SIM card activity information of the first SIM card.

In step 406, first server 111 determines whether historical SIM card activity information of the first SIM card is found in a second database in step 406. The second database is stored in a storage medium of first server 111. If the historical SIM card activity information of the first SIM card is found in the second database, first server 111 determines in step 407 whether the second database has been updated within a predefined time period. If the second database has been updated within a predefined time period, first server 111 sends the historical SIM card activity information of the first SIM card to first device 100 in step 410.

If the historical SIM card activity information of the first SIM card is not found in the second database, or if the second database has not been updated within a predefined time period, first server 111 sends a second request message to the service provider of the first SIM card in step 408. In step 409, first server 111 receives historical SIM card activity information of the first SIM card from the service provider, and updates the second database by storing the received historical SIM card activity information in the second database. First server 111 then performs step 410 and sends the historical SIM card activity information of the first SIM card to first device 100 in step 410.

The second database may comprise historical SIM card activity information of a plurality of SIM cards, including the first SIM card, housed in one or more devices that are managed by first server 111. According to one of the embodiments, the second database is updated based on information received from a plurality of network devices housing a plurality of SIM cards.

According to one of the embodiments, first server 111 maintains a database of the historical SIM card activity information of one or more SIM cards. The historical SIM card activity information of a SIM card may be determined by first server 111 or by first device 100 sending a request message to a predefined destination. In one example, the predefined destination is a mobile number associated with a service provider of the SIM card. The request message may be sent to the mobile number using the SIM card for which historical SIM card activity information or any other SIM card. The request message can also be sent by calling the mobile number. A response indicating the historical SIM card activity information of the SIM card. The response may also include information about remaining data usage of a data plan associated with the SIM card within a time period. It would be known to those skilled in the arts that data plans purchased for SIM cards may allow a user to have limited amount of data with a usage limit for a fixed price. When the usage limit is exceeded, the price may be charged per unit of data, and usage price may increase.

According to one of the embodiments of the present invention, first device 100 may have one or more SIM card slots which may be used to house one or more SIM cards respectively. Each SIM card slot houses one SIM card. The first database comprises records corresponding to each SIM card that is inserted or has been inserted in first device 100. For example, when a first SIM card is inserted in first device 100, processing unit 130 performs a database lookup on the first database to check whether there is an entry corresponding to identity of the first SIM card. If there is no entry corresponding to the identity of the first SIM card, processing unit 130 creates a new entry corresponding to the identity of the first SIM card. Processing unit 130 then determines historical SIM card activity information of the first SIM card and initializes the new entry or the already existing entry corresponding to the identity of the first SIM card by inserting the historical SIM card activity information corresponding to the first SIM card in the first database. When first device 100 uses the first SIM card for transmitting and receiving data, the historical SIM card activity information of the first SIM card is updated periodically in the first database. Similarly, when a second SIM card is inserted in first device 100, processing unit 130 initializes an entry corresponding to the identity of the second SIM card. First device 100 can house both the first and second SIM card at the same time since first device 100 may comprise a plurality of SIM card slots. One of the benefits of housing more than one SIM card is that the connections of the more than one SIM cards can be aggregated together to form an aggregated connection with increased bandwidth. The aggregated connection is perceived as one end-to-end connection by sessions or applications that are using it. Another benefit of housing more than one SIM card is that if a connection through one of the SIM cards fail abruptly, the other SIM cards can be used for transmitting and receiving data, and thus can act as a back-up.

According to one of the embodiments of the present invention, first server 111 maintains a second database for a plurality of SIM cards housed in a plurality of network devices. The second database comprises historical SIM card activity information of the plurality of SIM cards with corresponding identities of the plurality of SIM cards. The plurality of SIM cards may be housed in same or different network devices. In one variant, if there is no entry in the second database corresponding to a SIM card, for which historical SIM card activity information is requested, first server 111 creates an entry corresponding to the SIM card and then updates the entry according to historical SIM card activity information received from a service provider. For example, if a SIM card is being used for a first time, and no historical SIM card activity information is available yet, the second database may not contain an entry for the SIM card.

Figure 5:
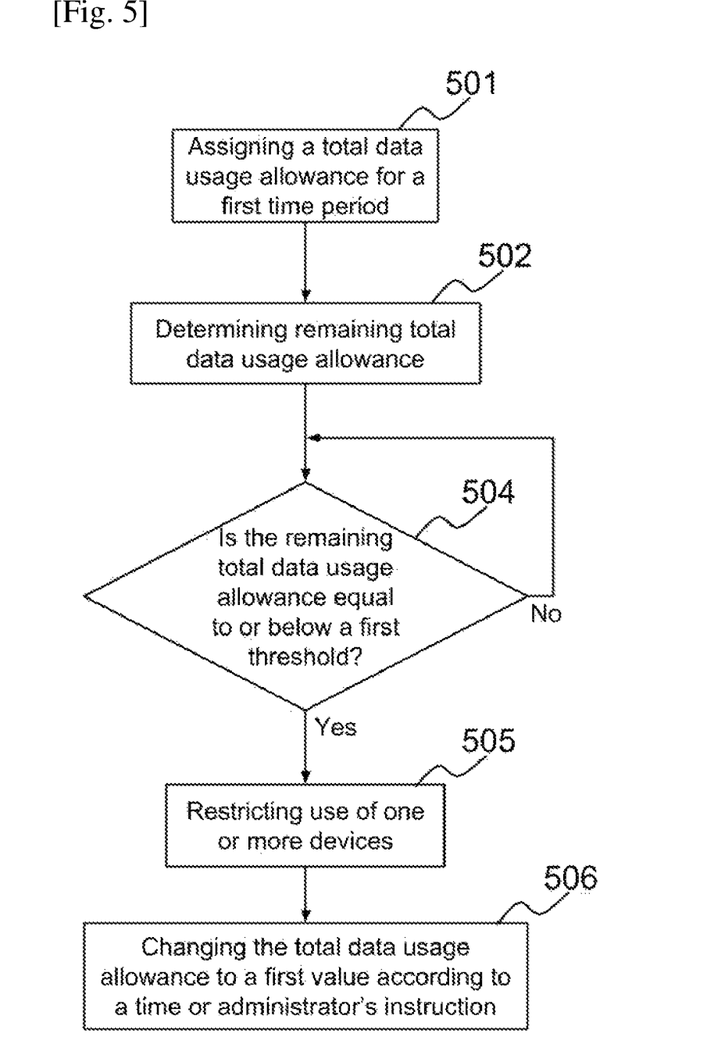
FIG. 5 is a flowchart illustrating a process according to one of the embodiments of the present invention.

FIG. 5 is a flowchart illustrating a process according to one of the embodiments of the present invention. Data usage can be shared among a plurality of network devices, such as first device 100 and second device 101. This embodiment allows both devices to use the data usage efficiently. The process of FIG. 5 can be performed by a server, such as first server 111, or can be performed by one or more of the plurality of network devices. In step 501, a total data usage allowance is assigned for a first time period to the plurality of network devices. When the total data usage allowance is assigned, the plurality of network devices together are only allowed to use the amount of data specified in the total data usage allowance. For example, a group data plan is purchased from a carrier for four network devices, and the total amount of data available for use with the four network devices is 10 GB. In this case, the total data usage allowance is 10 GB. The plurality of network devices are then allowed to use the data plan according to the total data usage allowance period.

In step 502, a remaining total data usage allowance is determined. The purpose of determining remaining total data usage allowance is similar to historical SIM card activity information discussed earlier. The difference between remaining total data usage allowance and historical SIM card activity information is that the historical SIM card activity information is information about the activity of a particular SIM card, which is retrieved according to the identity of the SIM card; whereas the remaining total data usage allowance corresponds to a data plan used by a plurality of network devices, and not a particular SIM card. In a first example, the remaining total data allowance is determined by sending a request message to a server, such as first server 111, and retrieving the remaining total data allowance from the server. The request message may comprise data plan information or identities of the plurality of network devices. In another example, the remaining total data allowance is determined by subtracting aggregated data usage information from the total data usage allowance. The aggregated data usage information can be determined based on data usage of each of the plurality of network devices. Information of data usage at each of the plurality of network devices is sent by each network device to first server 111, and first server 111 determines the aggregated data usage information based on this information.

In step 503, it is determined whether the remaining total data usage allowance is below a first threshold. The plurality of network devices are allowed to use the data as long as the remaining total data usage allowance is below the first threshold. For illustration, the first threshold is 1 GB.

If the remaining total data usage allowance becomes below the first threshold, one or more of the plurality of network devices are restricted from using the data plan in step 504. Step 504 is performed by first server 111. First server 111 sends instructions to one or more of the plurality of network devices for restricting their use. Restricting can be based on one or more of the following: priority, fairness, and statistical device usage history. In one variant, step 504 is performed by each of the plurality of network devices based on the remaining total usage allowance.

In one example, restricting in step 504 is based on priority. For illustration purposes, first device 100, second device 101, and a third device have highest, second-highest and lowest priorities respectively. The priorities are configured by a user or administrator of the plurality of network devices. The remaining total data usage allowance is allocated to first device 100, second device 101 and the third device according to the assigned priorities. Since the third device has the lowest priority, the third device is restricted from using any further data allowance from the remaining total data usage allowance, or is allowed to use a very small percentage of the remaining total data usage allowance. First device 100 is allowed to use all of the remaining total data usage allowance, or a large percentage of the remaining total data usage allowance, as first device 100 has highest priority. Since second device 101 has second-highest priority, it is allowed to use a higher percentage of the remaining total data usage allowance compared to the third device, but a lower percentage compared to first device 100. Alternatively, both the third device and second device 101 are not allowed to use any of the remaining total data usage allowance, and first device 100 uses all of the remaining total data usage allowance.

In another example, restricting in step 504 is based on fairness. The plurality of network devices comprises first device 100 and second device 101. For illustration purposes, the first threshold of step 503 is 2 GB. Therefore, when the remaining total data usage allowance becomes below 2 GB, step 504 is performed. First device 100 has used up 3 GB of the total data usage allowance, and second device 100 has used up 5 GB of the total data usage allowance. Therefore, the remaining total data usage allowance is 2 GB. In step 503, it is determined that the remaining total data usage allowance is about to become lower than the first threshold. Since first device 100 has only used 3 GB, which is less than half of the total data usage allowance, the first device 100 is allowed to use remaining total data usage allowance of 2 GB. Since second device 100 has already used 5 GB, which is half of the total data usage allowance, second device 100 is restricted from using any of the remaining total data usage allowance.

In another example, the restricting in step 504 is based on statistical device usage history. For example, a statistical activity report is generated at first server 111 based on historical activity information of each of the plurality of network devices. The statistical activity report may indicate which network device is more likely to require higher data usage allowance, by showing how each network device has used data usage in the past. For illustration purposes, the plurality of network devices comprise the first device 100 and second device 101, and the historical activity information of first device 100 and second device 101 suggests that the second device has had higher amount of data usage compared to first device 100. Therefore, when the remaining total data usage allowance becomes below the first threshold, the second device 101 is allowed to use the remaining total data usage allowance based on statistical device usage history, and first device 100 is restricted from using any of the remaining total data usage allowance in step 504.

In another example, the restricting in step 504 is based on other available SIM cards in each of the plurality of network devices. For example, a first data usage plan is shared by a first SIM card housed in first device 100 and a second SIM card housed in second device 101. First device 100 houses two SIM cards, namely the first SIM card and a third SIM card. Second device 100 houses only one SIM card, namely the second SIM card. Therefore, when the remaining total data usage allowance becomes below the first threshold, the second device 101 is allowed to use the remaining total data usage allowance, and first device 100 is restricted from using any of the remaining total data usage allowance in step 504. Since first device 100 houses a back-up SIM card, such as the third SIM card, it is likely that the first device 100 is not abruptly disconnected from the Internet if it is restricted from using any of the remaining total data usage allowance.

First device 100 can still be connected to the Internet using the third SIM card, even if first device 100 is restricted from using the remaining total data usage allowance associated with the first SIM card.

In step 505, the total data usage allowance is changed to a first value when the first time period is over. For example, when the first time period is one month, the total data usage allowance is set to 10 GB after every month in step 505. Alternatively, the total data usage allowance is changed to a first value upon receiving an instruction from an administrator of the plurality of network devices and/or first server 111.

According to one of the embodiments of the present invention, the process of FIG. 5 is performed at first device 100 in order to manage data usage allowance at a plurality of devices or hosts connected to the first device 100 through a plurality of LAN interfaces of first device 100 respectively. It is common that when a router, such as first device 100, is connected to the Internet, several devices or hosts can connect to the Internet using first device 100 through wired or wireless LAN connections with first device 100. For example, network interfaces 134 comprise a plurality of LAN interfaces, such as Ethernet interfaces or wireless LAN (WLAN) interfaces. A plurality of hosts, such as a first, second and third host connect to first device 100 using one or more of the plurality of LAN interfaces. The total data usage allowance for first device 100 is 10 GB. The value of 10 GB can be set by an administrator or a service provider or carrier. First device 100 may be use one or more WAN connections to connect to the Internet, and the total data usage allowance of 10 GB is the total amount of data that can be used at first device 100 using all of the one or more WAN connections. Steps 502 and 503 are conducted as discussed above. In step 504, first device 100 restricts one or more of the plurality of hosts from using any of the remaining total data usage allowance. As discussed above, the restriction is based on priority, fairness, or statistical device usage history.

Figure 6:
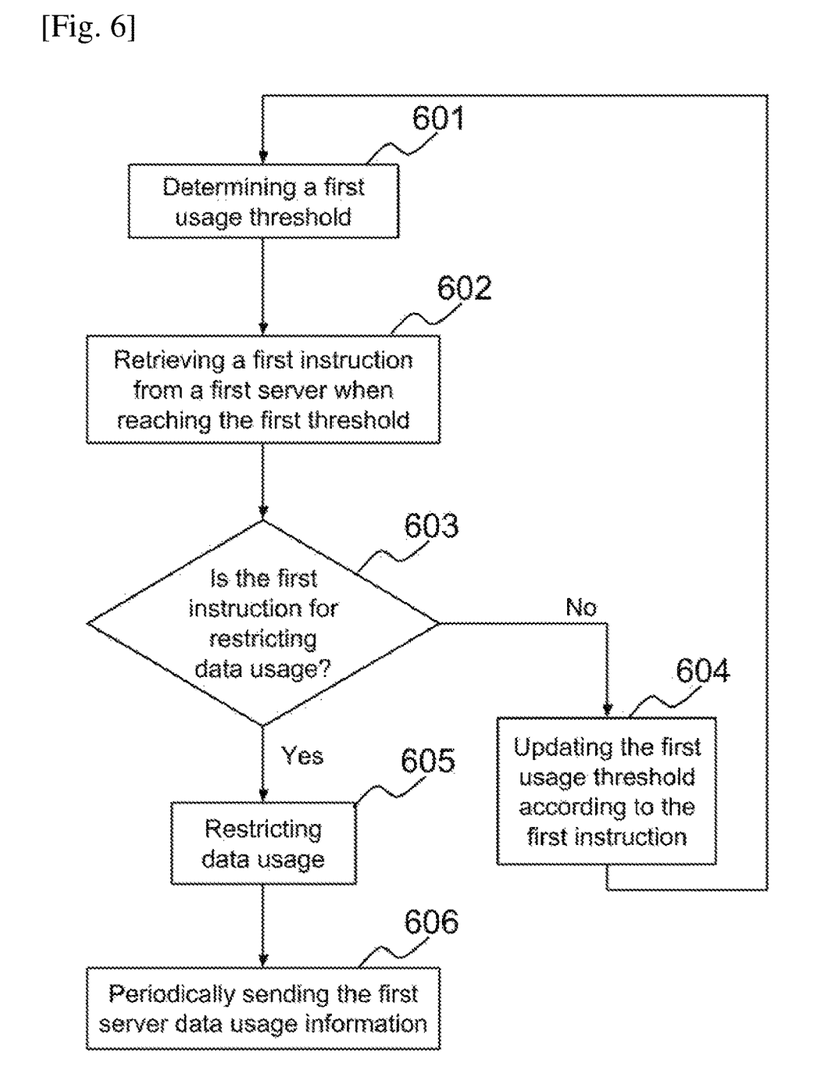
FIG. 6 is a flowchart illustrating a process according to one of the embodiments of the present invention.

FIG. 6 is a flowchart illustrating a process according to one of the embodiments of the present invention. The process of FIG. 6 is performed at first device 100. In step 601, processing unit 130 determines a first usage threshold set by an administrator or a service provider. The first usage threshold is based on total remaining data usage allowance determined by a computing device, such as first server 111 or first device 100 itself. For illustration purpose, the first usage threshold is 10 GB, it is preferred to not use more than 10 GB at first device 100. If the data usage at first device 100 is about to reach the first usage threshold, first device 100 retrieves a first instruction from first server 111. Step 602 can be performed by first sending a request message to first server 111, and then receiving the first instruction in step 602 in response to the request message. In step 603, processing unit 130 determines whether or not to restrict data usage based on the first instruction. If the first instruction is to restrict data usage, processing unit 130 restricts data usage in step 605. After the data usage is restricted, first device 100 is only allowed to use data up to the first usage threshold. When the first usage threshold is reached, one or more connections of first device 100 may be disconnected, or first device 100 may not be able to receive or transmit data through the one or more connections. If the first instruction is not to restrict data usage, the first instruction contains information for updating the first usage threshold. Processing unit 130 then updates the first usage threshold according to the first instruction in step 604. As the first usage threshold is updated, the process starts again from step 601. In step 606, first device 100 sends data usage information to first server 111 periodically. First device 100 also sends data usage information to first server 111 if a connection using a SIM card or a WAN interface is disconnected. One of the benefits of performing step 606 is that first server 111 has updated information about data usage information, which could be used for the contents of the first instruction or for managing other devices in relation with first device 100. More precisely, other devices may be devices in the same LAN or devices using a group data plan.

In one embodiment, when the first instruction is to update the usage threshold, the first instruction may comprise the new usage threshold and a time period for which the new usage threshold is valid. For example, when the usage threshold is 10 GB, and is about to be reached, the usage threshold can be updated to a new usage threshold of 20 GB, and the time period for the new usage threshold is specified as one month from the day on which the usage threshold is updated. When the time period of one month is over, the usage threshold may be updated again.

According to one of the embodiments, first server 111 is configured to update first usage threshold periodically after a predefined time period. For example, if the predefined time period is one month, first server 111 sends the first instruction to first device 100 for updating the first usage threshold after one month. Alternatively, first server 111 is configured to update first usage threshold when the usage at the first device 100 is about to reach the first usage threshold. One of the benefits of updating the first usage threshold when the usage is about to reach the first usage threshold is that first device 100 has available data allowance for use, even if the usage threshold is reached before the predefined time period is over.

According to one of the embodiments of the present invention, the first usage threshold is specified for total data usage at only the first network device, or the plurality of network devices, or only one SIM card or WAN interface of the first network device. For example, the first usage threshold of 10 GB is specified for only the first network device, and it is preferred to not use more than 10 GB of data usage at the first network device. The 10 GB data usage allowance is the total data usage allowance for all WAN connections established at the first network device using SIM cards and/or WAN interfaces. In another example, the first usage threshold of 10 GB is specified for a plurality of network devices, and it is preferred that the total data usage at the plurality of network devices does not exceed the usage threshold of 10 GB. In another example, the first usage threshold of 10 GB is specified for only one SIM card, such as the first SIM card, at the first network device, and it is preferred not to use more than 10 GB of data usage of a data plan associated with only the first SIM card. In another example, the first usage threshold is specified for a first WAN interface of the first network device, it is preferred to not use more than 10 GB of data usage at a connection established through the first WAN interface.

The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method of sharing data usage at a plurality of network devices, wherein the data usage is shared by a plurality of SIM cards, wherein each of the plurality of network devices is capable of housing at least one SIM card; wherein the at least one SIM card belongs to the plurality of SIM cards; comprising the steps:
   (a) determining the total data usage allowance;
   (b) determining the remaining total data usage allowance by:
      (i) retrieving the remaining total data usage allowance from a carrier server; or
      (ii) subtracting aggregated data usage information from the total data usage allowance, wherein the aggregated data usage information is based on data usage information received from each of the plurality of network devices;
   (c) restricting use of one or more of the plurality of SIM cards when the remaining total data usage allowance is below a first threshold;
   (d) performing step (c) until the remaining total data usage allowance is above the first threshold;
   (e) changing the total data usage allowance to a first value periodically or according to an administrator's instruction;
   wherein the plurality of SIM cards use the same cellular network or use different cellular networks.

2. The method of claim 1, wherein step (a) is performed by retrieving total data usage allowance from a carrier server or retrieving from a record; wherein the record is created as per an administrator's instruction.

3. The method of claim 1, wherein step (c) is performed after receiving a first instruction from the first server.

4. The method of claim 1, wherein step (c) is based on priority of the plurality of network devices, wherein network devices with higher priorities are allowed to use a higher percentage of the remaining total data usage allowance.

5. The method of claim 1, wherein each of the plurality of network devices is allowed to use equal amount of the total data usage allowance at step (c).

6. The method of claim 1, wherein network devices with higher amount of data usage indicated in a statistical device usage history is allowed to use the remaining total data allowance at step (c).

7. The method of claim 1, further comprising sending a request message to a server before performing step (b)(i) for determining the remaining total data usage allowance, wherein the request message comprises data plan information, and/or identity of the plurality of network devices.

8. The method of claim 1, further comprising sending a notification to a user or administrator when the remaining total data usage allowance is below the first threshold.

9. The method of claim 8, wherein the notification is chosen from a group consisting of email, instant message, short message service (SMS), phone call, message shown in a web page, popup message at a web page, alarm, a sound, blinking light, and flashing a light-emitting diode (LED).

10. A system for sharing data usage at a plurality of network devices, wherein the data usage is shared by a plurality of SIM cards, wherein each of the plurality of network devices is capable of housing at least one SIM card; wherein the at least one SIM card belongs to the plurality of SIM cards;
   wherein each of the plurality of network devices comprising:
      at least one wireless modem;
      at least one network interface;
      at least one main memory;
      at least one processing unit;
      at least one secondary storage storing program instructions executable by the at least one processing unit for the following steps:
      (a) determining the total data usage allowance;
      (b) determining the remaining total data usage allowance by:
         (i) retrieving the remaining total data usage allowance from a carrier server; or
         (ii) subtracting aggregated data usage information from the total data usage allowance, wherein the aggregated data usage information is based on data usage information received from each of the plurality of network devices;
      (c) restricting use of one or more of the plurality of SIM cards at one or more of the plurality of network devices when the remaining total data usage allowance is below a first threshold;
      (d) performing step (c) until the remaining total usage allowance is above the first threshold;
      (e) changing the total data usage allowance to a first value periodically or according to an administrator's instruction;
   wherein the plurality of SIM cards use the same cellular network or use different cellular networks.

11. The system of claim 10, wherein step (a) is performed by retrieving total data usage allowance from a carrier server or retrieving from a record; wherein the record is created as per an administrator's instruction.

12. The system of claim 10, wherein step (c) is performed after receiving a first instruction from the first server.

13. The system of claim 10, wherein step (c) is based on priority of the plurality of network devices, wherein network devices with higher priorities are allowed to use a higher percentage of the remaining total data usage allowance.

14. The method of claim 1, wherein each of the plurality of network devices is allowed to use equal amount of the total data usage allowance at step (c).

15. The system of claim 10, wherein network devices with higher amount of data usage indicated in the statistical device usage history is allowed to use the remaining total data allowance at step (c).

16. The system of claim 10, wherein the first at least one secondary storage further storing program instructions for: sending a request message to a server before performing step (b)(i) for determining the remaining total data usage allowance, wherein the request message comprises data plan information, and/or identity of the plurality of network devices.

17. The system of claim 10, wherein the first at least one secondary storage further storing program instructions for:

sending a notification to a user or administrator when the remaining total data usage allowance is below the first threshold.

18. The system of claim 17, wherein the notification is chosen from a group consisting of email, instant message, short message service (SMS), phone call, message shown in a web page, popup message at a web page, alarm, a sound, blinking light, and flashing a light-emitting diode (LED).

* * * * *